US012584687B2

(12) United States Patent
Clapham et al.

(10) Patent No.: US 12,584,687 B2
(45) Date of Patent: Mar. 24, 2026

(54) CONTINUOUS MICROWAVE DRYING FOR VACCINES

(71) Applicants: Andrew John Clapham, Hummelstown, PA (US); Charles Heldebrant, Arcadia, CA (US)

(72) Inventors: Andrew John Clapham, Hummelstown, PA (US); Charles Heldebrant, Arcadia, CA (US)

( * ) Notice: Subject to any disclaimer, the term of this patent is extended or adjusted under 35 U.S.C. 154(b) by 751 days.

(21) Appl. No.: 18/076,756

(22) Filed: Dec. 7, 2022

(65) Prior Publication Data

US 2023/0175775 A1 Jun. 8, 2023

Related U.S. Application Data

(60) Provisional application No. 63/286,818, filed on Dec. 7, 2021.

(51) Int. Cl.
*F26B 3/347* (2006.01)
*F26B 5/04* (2006.01)

(52) U.S. Cl.
CPC .............. *F26B 3/347* (2013.01); *F26B 5/048* (2013.01)

(58) Field of Classification Search
CPC ................................ F26B 3/347; F26B 5/048
USPC ...................................................... 34/92, 263
See application file for complete search history.

(56) References Cited

U.S. PATENT DOCUMENTS 2,751,687 A * 6/1956 Colton ...................... B01J 2/00 264/28
3,270,432 A * 9/1966 Barbareschi ............. B01D 7/00 34/305
4,455,135 A * 6/1984 Bitterly ..................... F26B 5/06 34/92
5,822,882 A * 10/1998 Anger ....................... F26B 5/06 34/92
6,935,049 B2 * 8/2005 Alstat ....................... C02F 1/22 34/92
7,096,600 B2 * 8/2006 Singh ........................ G21F 9/34 34/494
8,061,056 B2 * 11/2011 Hedberg ................. B04B 15/08 118/52
8,718,113 B2 5/2014 Durance et al.
8,722,749 B2 5/2014 Durance et al.
(Continued)

FOREIGN PATENT DOCUMENTS

CA 2781644 A1 * 7/2011 .............. A61P 31/04
EP 2526776 A2 * 11/2012 .............. A61P 31/04

*Primary Examiner* — Stephen M Gravini

(57) ABSTRACT

A continuous microwave vacuum-drying method includes loading, onto a conveyor belt, a lower half of an integrated container, filing, by a frozen-drug dispenser, a first chamber of a lower half of an integrated container with a frozen compound, exposing, by microwave emitters within a vacuum chamber, the frozen compound of the first chamber of the lower half of the integrated container to microwave radiation to lyophilize the frozen compound into a lyophilized compound, filing, by a reconstitution solution dispenser, a second chamber of the lower half of the integrated container with a reconstitution solution, removing, by the conveyor belt, the lower half of the integrated container out of the vacuum chamber, and sealing, by a container sealer, an upper half of the integrated container onto the lower half of the integrated container to create a prefilled integrated package.

20 Claims, 6 Drawing Sheets

(56) References Cited

U.S. PATENT DOCUMENTS

| | | | | |
|---|---|---|---|---|
| 8,877,469 | B2 | 11/2014 | Durance et al. | |
| 9,267,734 | B2 | 2/2016 | Durance et al. | |
| 9,273,901 | B2 | 3/2016 | Fu et al. | |
| 9,316,437 | B2 * | 4/2016 | Fu | F26B 5/048 |
| 9,958,203 | B2 | 5/2018 | Fu et al. | |
| 10,139,160 | B2 | 11/2018 | Fu et al. | |
| 10,139,161 | B2 | 11/2018 | Fu et al. | |
| 10,178,873 | B2 | 1/2019 | Durance et al. | |
| 10,578,359 | B2 | 3/2020 | Durance et al. | |
| 10,844,366 | B2 | 11/2020 | Durance | |
| 11,287,185 | B1 * | 3/2022 | Jiang | F26B 5/06 |
| 11,384,980 | B2 * | 7/2022 | Triglia, Jr. | F26B 13/008 |
| 11,723,870 | B1 * | 8/2023 | Harkins, Jr. | F26B 5/06 34/284 |
| 12,072,149 | B2 * | 8/2024 | Britton | F26B 5/06 |
| 2023/0175775 | A1 * | 6/2023 | Clapham | F26B 5/06 34/263 |

* cited by examiner

CONTINUOUS MICROWAVE DRYING FOR VACCINES

CROSS REFERENCE TO RELATED APPLICATION

This application claims the benefit of U.S. Provisional Application Ser. No. 63/286,818, filed Dec. 7, 2021, the entirety of which is incorporated by reference herein.

BACKGROUND OF THE INVENTION

Technical Field

Aspects of embodiments of the present disclosure relate to the field of microwave vacuum-drying of lyophilized vaccines, but also include organic materials, food products, and biologically active materials such as antibiotics, proteins, and microorganism cultures for administration to humans, animals, or plants. More specifically, aspects of embodiments of the present disclosure are directed to systems and methods for the continuous microwave vacuum drying of lyophilized drugs/vaccines within an integrated container.

Description of the Related Art

Dehydration of organic materials is commonly done in the production of biologically active materials such as vaccines and in the food processing industry to preserve the products for storage. Conventional methods of dehydrating organic products include air-drying and Traditional freeze-drying. However, these methods have limitations. Air-drying is a slow time-consuming process. Traditional freeze-drying is a batch process, time-consuming, and expensive.

Microwave vacuum-drying is a rapid method that can yield products with quality equal to or improved when compared to air-dried and traditional freeze-dried products. Because the vacuum drying is done under reduced pressure, the boiling point of water and the oxygen content of the atmosphere are lowered, so the qualities of the food and medicinal components sensitive to oxidation and thermal degradation can be retained to a higher degree than by air-drying. Moreover, the microwave vacuum-drying process is much faster than air-drying and traditional freeze-drying. However, microwave vacuum-drying, as currently, practiced has its limitations as well. With current microwave vacuum-drying methods, there are many steps involved and, thus, increased chance for contamination. In addition, because of the multiple steps involved, the currently available microwave vacuum-drying process may be expensive.

As such, to overcome the problems and limitations described above there is a need for a continuous vacuum microwave drying (CVMD) process utilizing an integrated container that enables the vaccine or other product to be packed directly into syringes or delivery devices.

Problems that are to be Solved by the Invention

As mentioned previously, currently offered dehydration methods may require the user to choose between air-drying or freeze-drying, which may be slow, time-consuming, and expensive processes. Moreover, the use of vacuum microwave drying methods may include multiple additional steps that may not only be more expensive but may expose the vaccine to contamination.

Means for Solving the Problem

Embodiments of the present disclosure including a continuous vacuum microwave drying (CVMD) process, without the previously required steps associated with batch freeze-drying, may obviate the need to use currently available dehydrating methods by providing systems and corresponding methods for the continuous production of CMVD lyophilized products within integrated containers.

Effect of the Invention

Aspects of embodiments of the present disclosure may provide the benefits of microwave dehydration with less steps for vaccine production and minimize costs and risk of contamination.

SUMMARY OF THE INVENTION

One or more embodiments of the present disclosure may be directed to a system and method for the continuous microwave vacuum-drying of a drug compound within an integrated container.

A continuous microwave vacuum-drying method includes loading, onto a conveyor belt, a lower half of an integrated container, filing, by a frozen-drug dispenser, a first chamber of a lower half of an integrated container with a frozen compound, exposing, by microwave emitters within a vacuum chamber, the frozen compound of the first chamber of the lower half of the integrated container to microwave radiation to lyophilize the frozen compound into a lyophilized compound, filing, by a reconstitution solution dispenser, a second chamber of the lower half of the integrated container with a reconstitution solution, removing, by the conveyor belt, the lower half of the integrated container out of the vacuum chamber, and sealing, by a container sealer, an upper half of the integrated container onto the lower half of the integrated container to create an integrated package having reconstitution solution in a first chamber of the integrated package and lyophilized compound in a second chamber of the integrated package.

The continuous microwave vacuum-drying method may have the conveyor belt be configured to continuously move the integrated container through the vacuum chamber.

The continuous microwave vacuum-drying method may have the microwave emitters within the vacuum chamber be configured to emit microwave radiation at a frequency that selectively heats water molecules within the frozen compound.

The continuous microwave vacuum-drying method may have the frozen-drug dispenser and the reconstitution solution dispenser be located within the vacuum chamber.

The continuous microwave vacuum-drying method may have the container sealer include a press and a heating element configured to thermally bond the lower half of the integrated container to the upper half of the integrated container.

The continuous microwave vacuum-drying method may have the frozen compound include a vaccine.

The continuous microwave vacuum-drying method may have the lower half of the integrated container include a connector forming a communicable channel between the first chamber and the second chamber.

The continuous microwave vacuum-drying method may have the connector include a frangible membrane configured to separate the first chamber and the second chamber.

The continuous microwave vacuum-drying method may have the integrated package include a syringe having the first chamber and the second chamber separated by the frangible membrane.

A continuous microwave vacuum-drying (CMVD) integrated package assembly system includes a lower half of an integrated container having a first chamber and a second chamber, an upper half of the integrated container, a vacuum chamber configured to maintain a low-pressure gradient between an interior of the vacuum chamber and an exterior of the vacuum chamber, a frozen-drug dispenser configured to deliver a frozen compound into the first chamber of the lower half of the integrated container, a microwave emitter configured to emit microwave radiation onto the frozen compound delivered into the first chamber of the lower half of the integrated container, a reconstitution solution dispenser configured to deliver a reconstitution solution into the second chamber of the lower half of the integrated container, a container sealer configured to seal the upper half of the integrated container to the lower half of the integrated container to form an integrated package; and a conveyor belt configured to transport the lower half of the integrated container to the frozen-drug dispenser, the microwave emitter, the reconstitution solution dispenser, and then the container sealer, in order.

The continuous microwave vacuum-drying (CMVD) integrated package assembly system may have the conveyor belt be further configured to transport the lower half of the integrated container into and out of the vacuum chamber.

The continuous microwave vacuum-drying (CMVD) integrated package assembly system may have the vacuum chamber include an automated series of air-lock doors configured to open and close in a timed sequence that permits maintenance of the low-pressure gradient of the interior of the vacuum chamber while the conveyor belt transports the lower half of the integrated container into and out of the vacuum chamber.

The continuous microwave vacuum-drying (CMVD) integrated package assembly system may have the conveyor belt be configured to operate in a continuous mode.

The continuous microwave vacuum-drying (CMVD) integrated package assembly system may have the frozen compound include a vaccine.

The continuous microwave vacuum-drying (CMVD) integrated package assembly system may have the microwave emitters be configured to emit microwave radiation at a frequency that selectively heats water molecules within the frozen compound.

The continuous microwave vacuum-drying (CMVD) integrated package assembly system may have the lower half of the integrated container further include a connector having a frangible membrane.

A large-container continuous microwave vacuum-drying method includes, loading, into an integrated container, a plurality of lower halves of a plurality of integrated packages, moving, by a conveyor belt, the integrated container into a vacuum chamber, filing, by a frozen-drug dispenser, a first chamber of one of the plurality of lower halves of the plurality of integrated packages loaded into the integrated container with a frozen compound, exposing, by microwave emitters, the frozen compound of the first chamber of one of the plurality of lower halves of the plurality of integrated packages loaded into the integrated container to microwave radiation to lyophilize the frozen compound into a lyophilized compound, filing, by a reconstitution solution dispenser, a second chamber of one of the plurality of lower halves of the plurality of integrated packages loaded into the integrated container with a reconstitution solution, removing, by the conveyor belt, the integrated container out of the vacuum chamber, and sealing, by a container sealer, a plurality of upper halves of the integrated packages loaded into the integrated container onto the plurality of lower halves of the integrated packages loaded into the integrated container to create a plurality of prefilled integrated packages.

The large-container continuous microwave vacuum-drying method may be operated in a continuous mode.

The large-container continuous microwave vacuum-drying method may have the vacuum chamber include a series of air-lock doors configured to maintain a low-pressure gradient within an inner volume of the vacuum chamber.

The large-container continuous microwave vacuum-drying method may have the frozen compound include a vaccine.

BRIEF DESCRIPTION

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
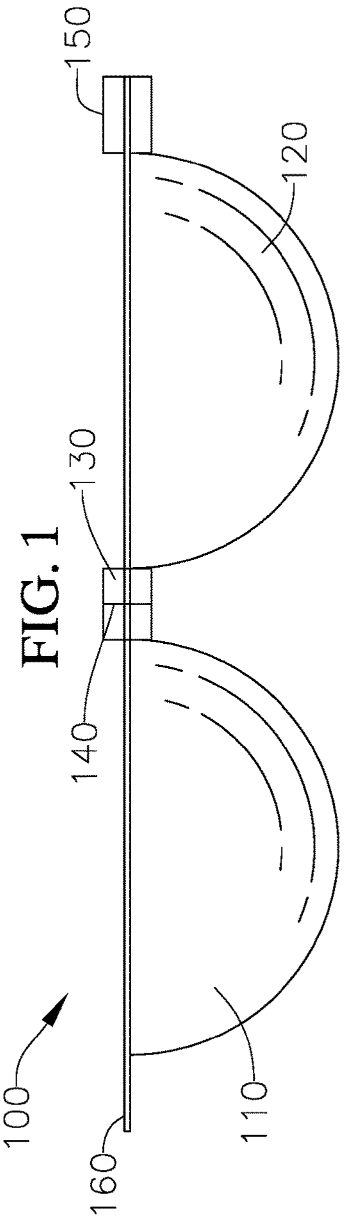
FIG. 1 is a cross-sectional view of a lower half of an integrated container having 2 chambers, according to aspects of embodiments of the present disclosure.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

For the purposes of this application, the words vaccine, organic material, food products, biologically active materials, antibiotics, proteins, or microorganism cultures may be understood to be interchangeable with each other, unless otherwise specified. Moreover, the words humans, animals, plants, and organisms may be interchangeable with each other, unless otherwise specified.

One or more embodiments according to the present disclosure will now be described. As described previously, embodiments of the present disclosure are directed to systems and corresponding methods for the production of lyophilized drug products within integrated containers using a continuous microwave vacuum-drying process (CMVD).

Two-Chamber Integrated Containers

As described above, some embodiments of the present disclosure may allow for the production of lyophilized drug products using integrated containers. Further understanding of the integrated containers may be had by reference to the following descriptions of FIGS. 1-2.

FIG. 1 is a cross-sectional view of a lower half of an integrated container 100 having 2 chambers, first chamber 120 and second chamber 110, according to aspects of embodiments of the present disclosure. As depicted, the lower half of the integrated container 100 may include two chambers, first chamber 120 and second chamber 110. However, in some other embodiments, a lower half of the integrated container may include three or more chambers (not shown). The first chamber 120 and the second chamber 110 may, in some embodiments, have any size and/or geometry suitable for containing a fluid and/or solid drug compound as would be known to one skilled in the art. The lower half of the integrated container 100, and, in some embodiments, the entire integrated container, may be constructed from an inert plastic or polymer compound. Any suitable plastic or polymer compound as would be known to one skilled in the art may be used for the construction of the components of the integrated container, e.g., the lower half of the integrated container 100, within the scope of the present disclosure. In some embodiments, the component parts of the integrated container, e.g., the lower half of the integrated container 100, may be made from a plastic or polymer compound that is "see through" or otherwise transparent enough to allow a user to visually inspect the contents of the first chamber 120 and the second chamber 110.

In some embodiments, the first chamber 120 and the second chamber 110 may be constructed from the same material. However, in some other embodiments, the first chamber 120 and the second chamber 110 may be constructed from different materials. Likewise, the first chamber 120 and the second chamber 110 may, in some embodiments, have different dimensions, geometries, and other physical properties, such as wall thickness, to meet various user needs. As a non-limiting example, in some embodiments, the first chamber 120 may be smaller in volume than the second chamber 110.

The first chamber 120 and the second chamber 110 may, in some embodiments, be configured to contain a drug product compound, such as but not limited to, fluid drug products, reconstitution solutions, lyophilized drug products, lyophilized vaccines, binary drug product compounds, and any other solutions that may be administered via injection. Moreover, the first chamber 120 may be configured to contain a different drug product compound or fluid than the second chamber 110. For example, in some embodiments, the first chamber 120 may be configured to contain a fluid while the second chamber 110 is configured to contain a solid compound such as a lyophilized drug or vaccine. In some other embodiments, the second chamber 110 may be configured to be a "mixing chamber," i.e., a chamber intended to have the contents of the first chamber 120 delivered into and mixed within itself. In some other embodiments, the configurations of the first chamber 120 and the second chamber 120 may be reversed, such that the first chamber 120 is filled with a frozen compound and the second chamber 110 is configured to contain a liquid.

In some other embodiments, the first chamber 120 and/or the second chamber 110 may be configured to contain contents in a solid, liquid, or gaseous state. As a non-limiting example, the first chamber 120 may be configured to contain a solid while the second chamber 110 is configured to contain a gas.

In some embodiments, the lower half of the integrated container 100 may include a connector 130 forming a communicable channel between the first chamber 120 and the second chamber 110. In embodiments having 3 or more chambers (not shown), additional connectors may be used to connect any pair of chambers. The geometry and size of the connector 130 may be varied to meet different user needs, and any suitable geometry and size for the connector 130 as would be known to one skilled in the art is within the scope of the present disclosure. As a non-limiting example, the connector 130 may be a tube or otherwise cylindrical channel between the first chamber 120 and the second chamber 110.

In some embodiments, the connector 130 may include a frangible membrane 140 that may be configured to separate the first chamber 120 and the second chamber 110. In embodiments where the contents of the first chamber 120 are intended to be mixed with the contents of the second chamber 110 prior to administration of the mixed contents, the frangible membrane 140 may be configured to rupture or otherwise break upon the application of a sufficiently large amount of mechanical force provided by a user. The frangible membrane 140 may be configured, in some embodiments, to have a strength that causes the frangible membrane 140 to rupture or otherwise break only once a mechanical force exceeding a "rupture threshold" value is applied. In some embodiments, this rupture threshold value may be varied according to the construction of the frangible membrane 140 including, but not limited to, the material composition of the frangible membrane 140, the thickness and/or dimensions of the frangible membrane 140, and the location of the frangible membrane 140 within the connector 130.

Any suitable material as known to one skilled in the art may be used for the construction of the frangible membrane 140 within the scope of the present disclosure. This may include, but is not limited to, polyethylene, Teflon®, polypropylene, or other suitable frangible material that may rupture before the device, i.e., the integrated container, ruptures. In some embodiments, the frangible membrane 140 may be constructed from an inert material to prevent interaction with the contents of the first chamber 120 and/or second chamber 110. In some other embodiments, the frangible membrane 140 may be constructed from any suitable thermally sealable material as would be known to one skilled in the art.

In some other embodiments, a connector may include both a valve and a frangible membrane. In said embodiments, the arrangement of the frangible membrane and the valve may be varied according to user need. As a non-limiting example, for an embodiment configured to have a first chamber configured to contain a solid and a second chamber configured to contain a liquid, a frangible membrane may be located between the first chamber and a valve.

In some embodiments configured to have a valve, the valve may serve to prevent backflow of fluid being mixed in one chamber from flowing back into its original chamber. As a non-limiting example, in an embodiment such as the one previously described, the valve may prevent backflow of the mixed solution from the first chamber back into the second chamber. In some of these embodiments, the valve may be a one-way valve. In some other embodiments, the valve may be configured as a disk valve or be configured to have a valve disk. However, any type of valve known to one skilled in the art to be suitable for preventing the backflow of a fluid may be used within the scope of the present disclosure. Additionally, in some other embodiments, the valve may be configured to allow for an aspiration test prior to the administration of the mixed solution.

In some embodiments the frangible membrane 140 may be integrated with, or otherwise contain, a valve.

Figure 2:
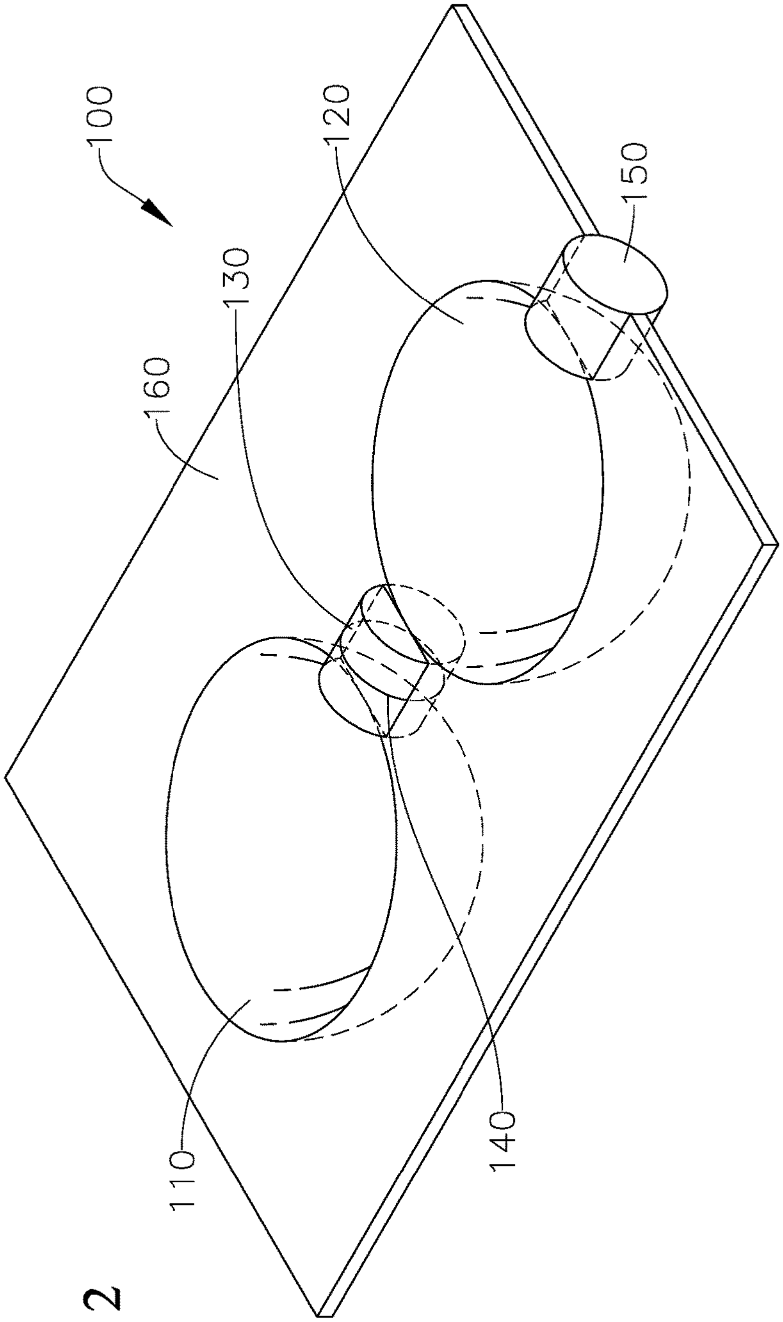
FIG. 2 is a perspective view of a lower half of an integrated container having 2 chambers, according to aspects of embodiments of the present disclosure.

Turning now to FIG. 2, a perspective view of a lower half of an integrated container 100 having 2 chambers, first chamber 120 and second chamber 110, according to aspects of embodiments of the present disclosure, is shown. This view may help to clarify the proportions, of some embodiments, of the features of the lower half of the integrated container 100 relative to each other.

Continuous Microwave Vacuum-Drying (CMVD) Production Line

The production of a lyophilized drug product, such as a vaccine, in a continuous microwave vacuum-drying process will now be described and the steps of the production process will be described, along with the corresponding components of the production line system, in FIGS. 3-6. For ease of description, the following steps may be described using the 2-chambered lower half of the integrated container (100 of FIGS. 1 and 2). However, the following steps are not limited to use only with the 2-chambered embodiments of the lower half of the integrated container (100 of FIG. 1). All variations to the following steps to configure the production line to use other embodiments of the integrated container, such as a 3-chambered embodiment, are within the scope of the present disclosure.

I. The Vaccine Filling Step

Figure 3:
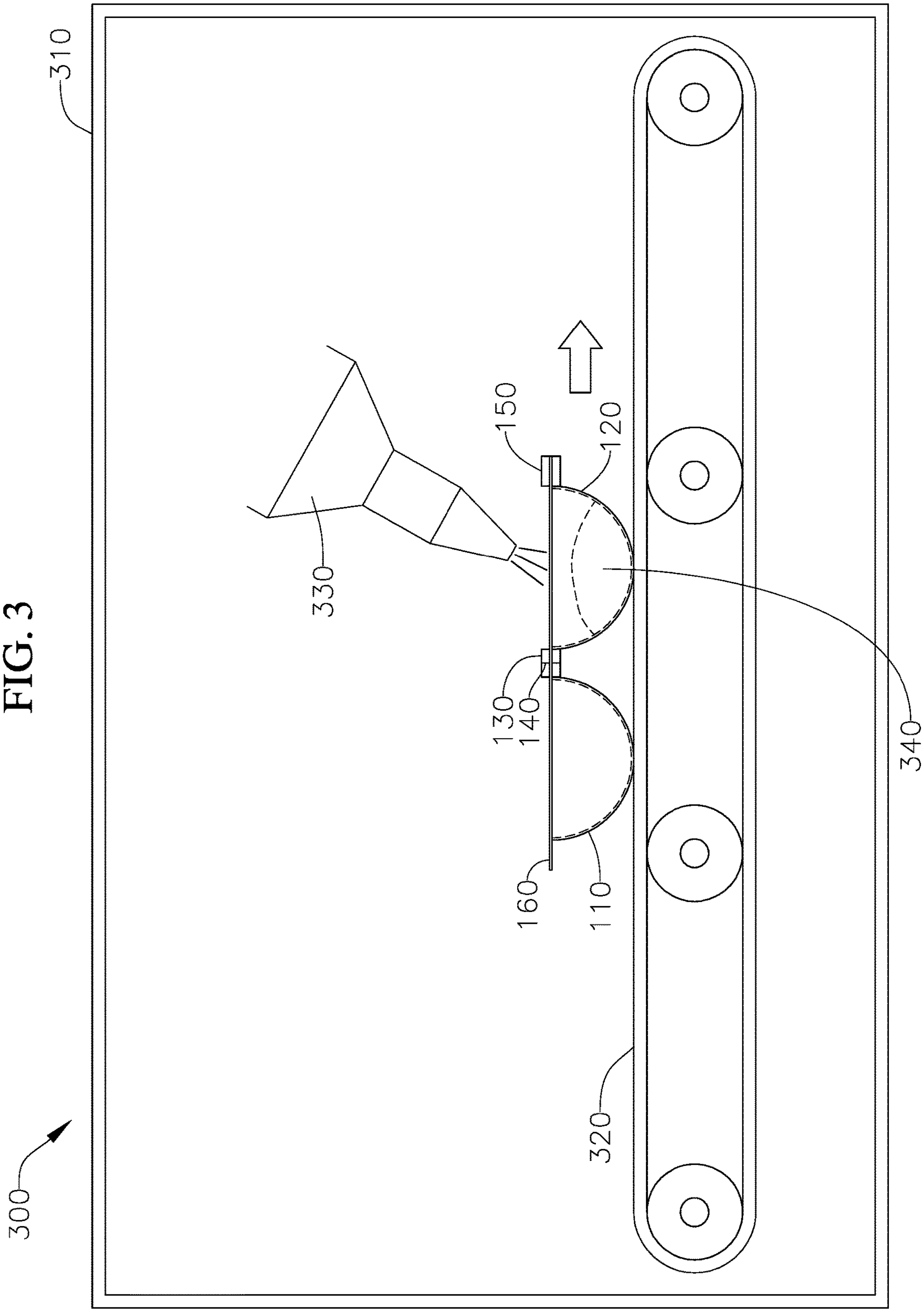
FIG. 3 is a diagram depicting a vaccine-filling step for a lower half of an integrated container having 2 chambers, according to aspects of embodiments of the present disclosure.

FIG. 3 is a diagram depicting a vaccine-filling step 300 for a lower half of an integrated container 100 having 2 chambers, first chamber 120 and second chamber 110, according to aspects of embodiments of the present disclosure.

As depicted, in some embodiments, a lower half of an integrated container (100 of FIG. 1) may be placed on a conveyor belt 320. In some embodiments the conveyor belt 320 may include a plurality of individually controllable belts configured in a production line. In some embodiments, the conveyor belt 320 may be operated by one or more motors (not shown) linked to one or more spoked/toothed wheels configured to drive the conveyor belt. As will be appreciated by one skilled in the art, any suitable configuration and material compositions for the components of the conveyor belt 320 and/or components that motorize the conveyor belt 320 may be used within the scope of the present disclosure.

In some embodiments, the conveyor belt 320 may be configured to transport the lower half of the integrated container (100 of FIG. 1) into and out of a vacuum chamber 310. As will be appreciated by one skilled in the art, the vacuum chamber 310 may, in some embodiments, be configured to maintain a low-pressure gradient between an interior volume of the vacuum chamber 310 and an exterior of the vacuum chamber 310. In some embodiments, this gradient may be maintained by one or more pumps (not shown). The vacuum chamber 310 may, in some embodiments, be made from a metal, glass, ceramic, or polymer compound. Any material known by one skilled in the art to be suitable for the purpose of maintaining a vacuum may be used for the construction of the vacuum chamber 310 within the scope of the present disclosure.

In some embodiments, the vacuum chamber 310 may include a series of automated air-lock doors (not shown) configured to allow integrated containers, or lower halves of integrated containers (100 of FIG. 1), to pass into and out of the vacuum chamber 310 along the conveyor belt 320 while maintaining the low-pressure gradient within the interior volume of the vacuum chamber 310. Any suitable configuration and componentry for the series of automated air-lock doors as would be known by one skilled in the art to be suitable for the purpose of maintaining a pressure gradient within a vacuum chamber 310 may be used within the scope of the present disclosure. In some embodiments, the series of automated air-lock doors may be controlled by a timer, or a microcontroller, configured to operate the opening and closing of the series of automated air-lock doors in a timed sequence. Such embodiments may allow for the "continuous" mode of operation of the production line, wherein the movement of the integrated containers, or upper and lower halves of the integrated containers (100 of FIG. 1), is only minimally, if ever, interrupted along the production line.

In order to fill the first chamber 120 of the lower half of the integrated container (100 of FIG. 1) with a frozen compound 340, in some embodiments, a frozen-drug dispenser 330 may be used to deliver frozen drug, vaccine, or other medicinal compounds (frozen compound 340) into the first chamber 120. In some embodiments, the frozen-drug dispenser 330 may include a refrigeration unit (not shown) to freeze the frozen compound 340. In some other embodiments, a frozen-drug dispenser may have a motorized door and a measured filling chamber to provide measured amounts of frozen compound 340 to the first chamber 120 by filling the measured chamber and then releasing the motorized door to drop the frozen compound 340.

As will be appreciated by one skilled in the art, although this step (vaccine filling step 300) is depicted taking place within the vacuum chamber 310, in some embodiments, the vaccine filling step 300 may be performed outside of the vacuum chamber 310.

II. The CMVD Lyophilization Step

Figure 4:
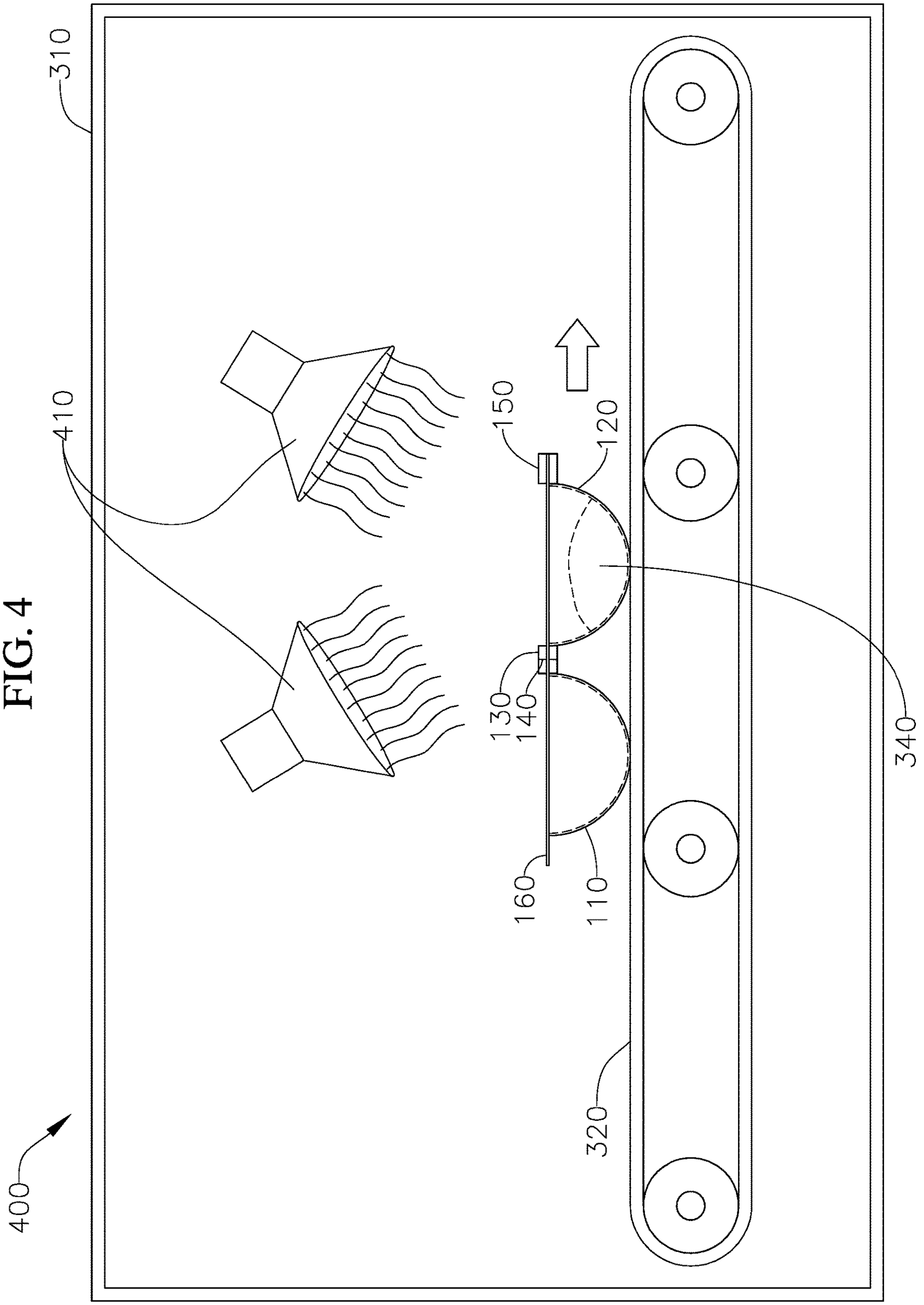
FIG. 4 is a diagram depicting a continuous microwave vacuum-drying step, according to aspects of embodiments of the present disclosure.

FIG. 4 is a diagram depicting a continuous microwave vacuum-drying (lyophilization) step 400, according to aspects of embodiments of the present disclosure.

As shown, in some embodiments, one or more microwave emitters 410 may be used to expose the frozen compound 340 delivered to the first chamber 120 in the previous step, vaccine filling step 300, to microwave radiation. Any type of microwave emitters 410 known by one skilled in the art to be suitable in output power and frequency for the purpose of drying frozen drug compounds may be used within the scope of the present disclosure. In some embodiments, the microwave emitters 410 may be configured to emit a frequency of microwave radiation that may specifically heat water molecules within the frozen compound 340. In such embodiments, the microwave radiation may increase the sublimation rate of the water out of the frozen compound 340.

Moreover, when used in combination with the low-pressure gradient of the vacuum chamber 310, a continuous microwave vacuum-drying process (i.e., step 400) may be achieved, in some embodiments, in which the decreased pressure of the vacuum chamber 310 may be used to further increase the sublimation of the water out of the frozen compound 340. In such embodiments, the rate of production of a lyophilized drug or vaccine product from the frozen compound 340 may be increased. For ease of description, the frozen compound 340 prior to and during the CMVD lyophilization step 400 may be referred to hereinafter as lyophilized compound 342 after the CMVD lyophilization step 400, such as in FIG. 5.

III. The Reconstitution Solution Filling Step

Figure 5:
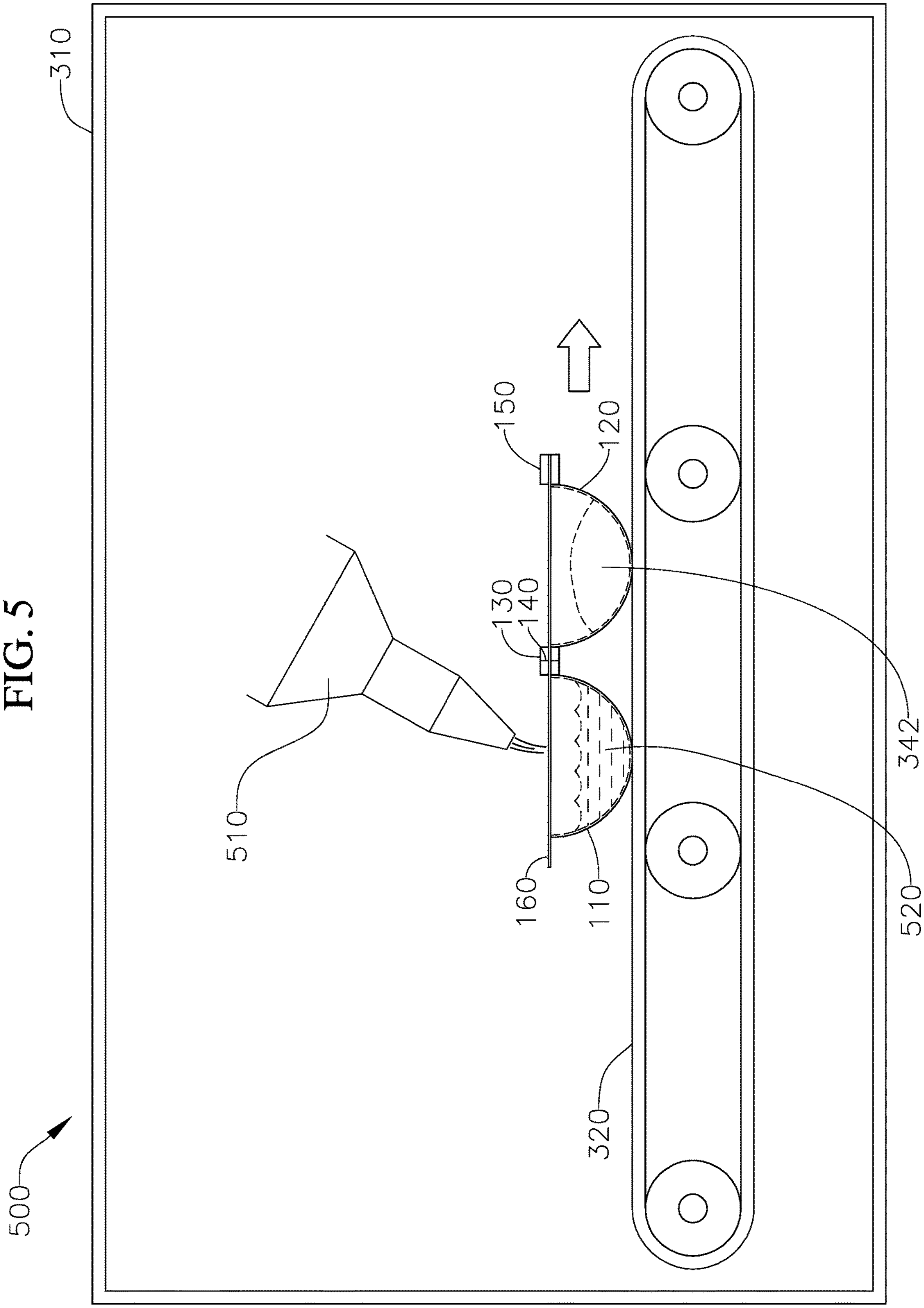
FIG. 5 is a diagram depicting a reconstitution solution filling step, according to aspects of embodiments of the present disclosure.

FIG. 5 is a diagram depicting a reconstitution solution filling step 500, according to aspects of embodiments of the present disclosure.

As depicted, during the reconstitution solution filling step 500, in some embodiments, a reconstitution solution dispenser 510 may deliver a measured amount of a fluid 520 to the second chamber 110 of the integrated container (100 of FIG. 1). In some embodiments, the fluid 520 may be a reconstitution solution. As will be appreciated by one skilled in the art, the specific reconstitution solution used may, in some embodiments, be varied according to the lyophilized drug or vaccine compound (i.e., lyophilized compound 342) created in the previous step, step 400. For convenience, fluid 520 may be used interchangeably with reconstitution solution 520 for the purposes of the present disclosure.

Focusing again on the reconstitution solution dispenser 510, any suitable configuration and componentry for the reconstitution solution dispenser 510 as would be known to one skilled in the art may be used within the present disclosure. In some embodiments, the measured delivery of the reconstitution solution dispenser 510 may be automated. In such embodiments, the timing of the reconstitution solution dispenser 510 may be controlled by a timer or a microcontroller (not shown).

As will be appreciated by one skilled in the art, although the reconstitution solution filling step 500 is depicted taking place within the vacuum chamber 310, in some embodiments, the reconstitution solution filling step 500 may be performed outside of the vacuum chamber 310.

IV. The Integrated Container Sealing Step

Figure 7:
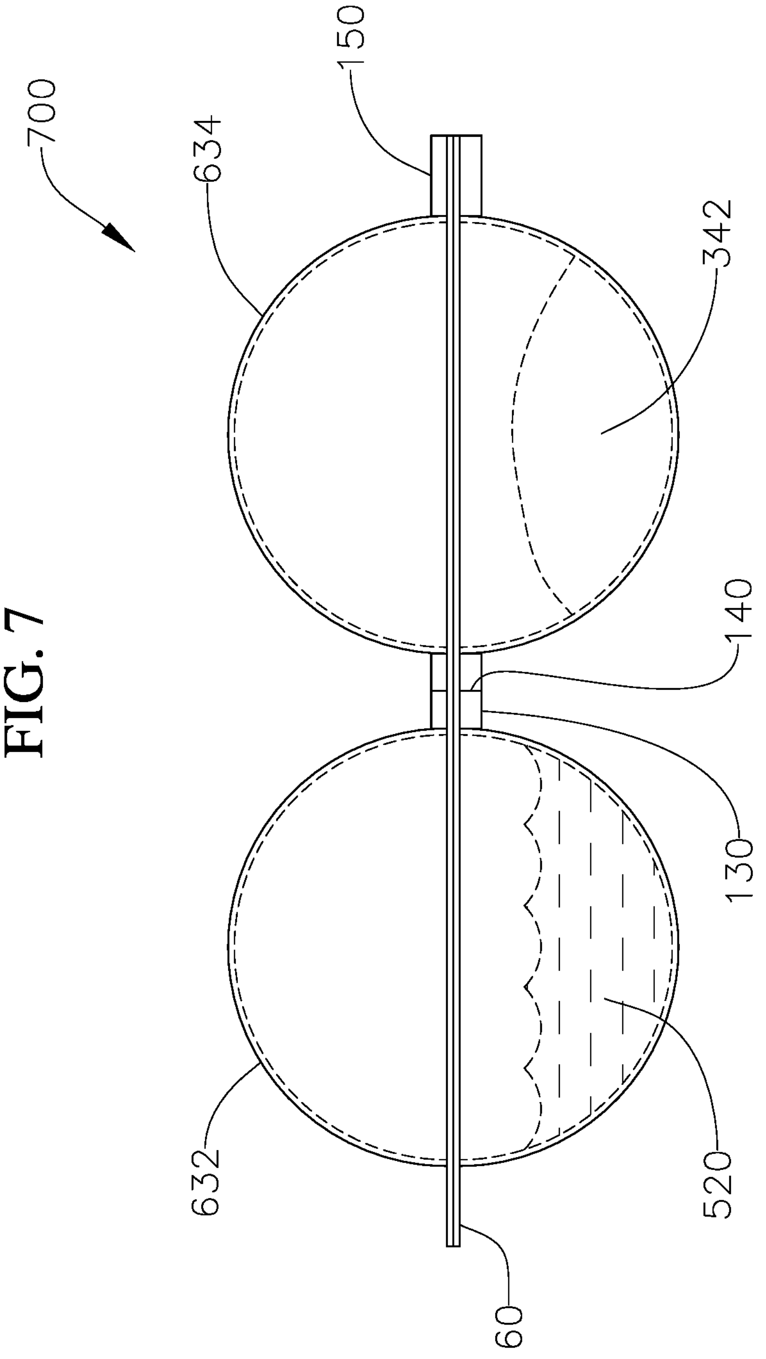
FIG. 7 is a cross-sectional view of a prefilled integrated container having 2 chambers, according to aspects of embodiments of the present disclosure.

After the first chamber 120 has been filled with a lyophilized drug or vaccine compound (i.e., lyophilized compound 342), and the second chamber 110 has been filled with a fluid 520 or reconstitution solution 520, the lower half of the integrated container (100 of FIG. 1) may be sealed to form a prefilled integrated package (700 of FIG. 7).

Figure 6:
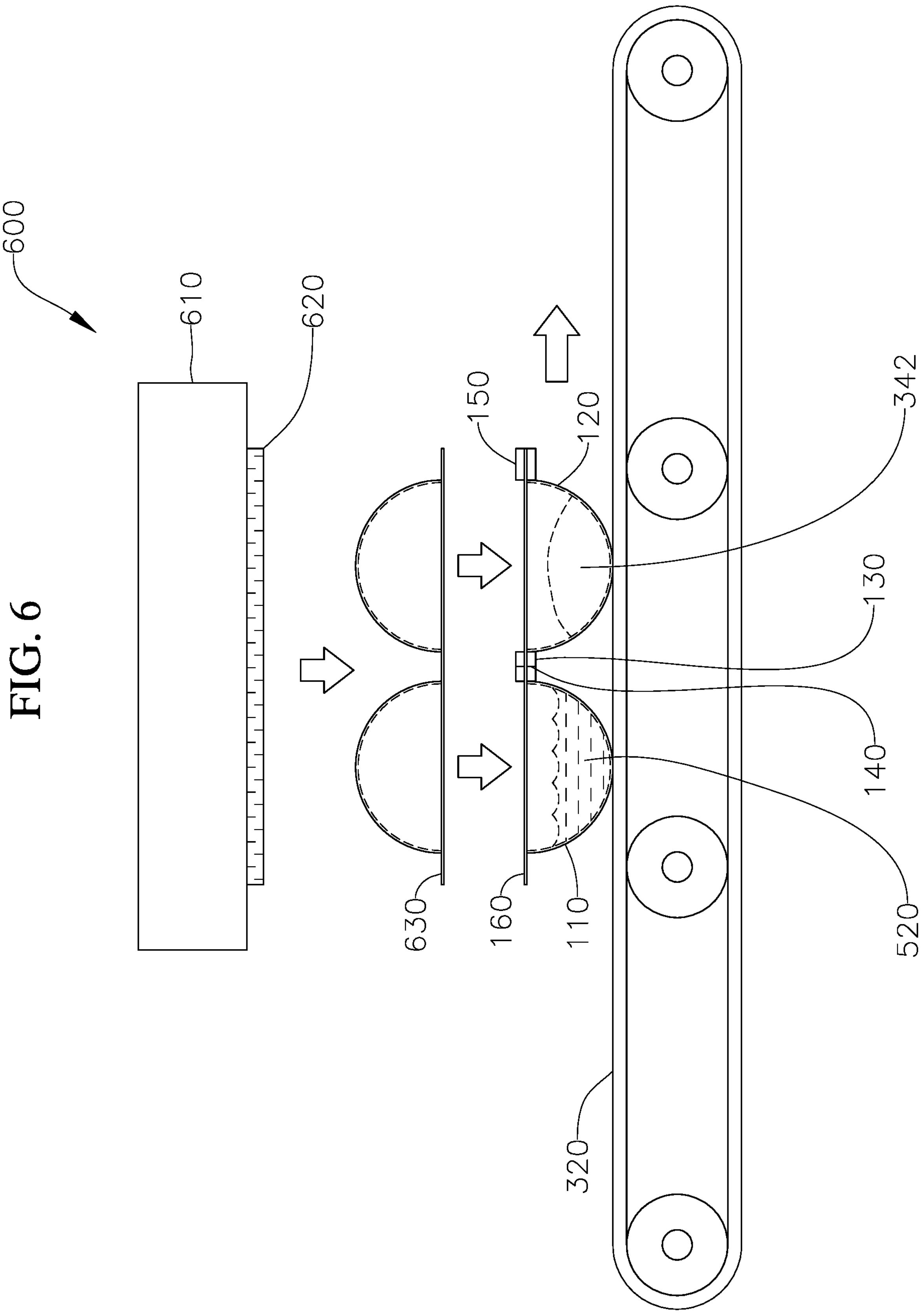
FIG. 6 is a diagram depicting an integrated container sealing step, according to aspects of embodiments of the present disclosure.

FIG. 6 is a diagram depicting an integrated container sealing step 600, according to aspects of embodiments of the present disclosure As depicted, in some embodiments of the integrated container sealing step 600, an upper half 630 of the integrated container may be sealed/bonded to the lower half of the integrated container (100 of FIG. 1) that has proceeded along the production line. The sealing may, in some embodiments, be performed by a container sealer 610. In some embodiments, the container sealer 610 may include a press to apply pressure along a periphery of the integrated container. In some other embodiments, the container sealer 610 may further include a heating element 620 to heat and thermally bond the upper half 630 of the integrated container to the lower half of the integrated container (100 of FIG. 1).

Once the upper half 630 of the integrated container has been sealed to the lower half of the integrated container (100 of FIG. 1), the sealed integrated container may, in some embodiments be referred to herein as an integrated package or a prefilled integrated package (700 of FIG. 7).

Prefilled Integrated Packages

FIG. 7 is a cross-sectional view of a prefilled integrated package 700 having 2 chambers, first chamber 120 and second chamber 110, according to aspects of embodiments of the present disclosure. As depicted, in some embodiments, once the production line has completed the integrated container sealing step 600, the sealed container may be removed from the production line and referred to as an integrated package 700. In some embodiments, the integrated package 700 may include a hub 150. In some embodiments, the hub 150 may include a port (not shown). In some other embodiments, a needle assembly (not shown) may be operably coupled to the hub 150 to facilitate drug delivery directly from the integrated package 700 after the frangible membrane 140 has been ruptured and the components of the first chamber 120 and the second chamber 110 have been mixed.

Large-Container Variations of the CMVD Production Line

As described previously, the CMVD production line of the present disclosure may be configured to operate using different variations of an integrated container. As a non-limiting example, the integrated container may be configured as a large container configured to hold one or more integrated package lower halves (that may be similar to the 2-chambered lower halves of the integrated containers (100 of FIG. 1)). In some other large container embodiments, the integrated container may be configured with a plurality of package portions, wherein each package portion is configured to be similar to the 2-chambered lower half of the integrated container 100 as previously described, that can be sealed during step 600 and then separated to produce a plurality of prefilled integrated packages 700.

As a non-limiting example, the CVMD production line of the present disclosure may be configured to operate using an integrated container having a large internal volume that may be configured to contain a plurality of lower halves of integrated packages, i.e., the previously described lower halves of integrated containers (100 of FIG. 1). According to some embodiments of the previously described steps of the present disclosure, the plurality of lower halves of the integrated packages within the integrated container may then proceed along the production line making any changes as would be known to one skilled in the art to account for the use of the large container. The previously described steps, i.e., steps 300, 400, 500, and 600, may, in some embodiments, then be carried out for each of the plurality of lower halves of the integrated packages contained within the integrated container.

After the plurality individual integrated packages (prefilled integrated packages 700) have been sealed, in some embodiments, each of the prefilled integrated packages 700 may then be removed from the integrated container. In some embodiments, the removal of a prefilled integrated package 700 from the integrated container may require mechanical separation from the integrated container and/or the other prefilled integrated packages 700. The prefilled integrated packages 700 may, in some embodiments, thus be similar in configuration to the integrated packages described previously in regard to FIG. 7, and they may include similar or identical features.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claim. It should be noted that although examples of the invention are set forth herein, the claims, and the full scope of any equivalents, are what define the metes and bounds of the invention.

What is claimed is:

1. A continuous microwave vacuum-drying method, comprising:

loading, onto a conveyor belt, a lower half of an integrated container;

moving, by the conveyor belt, the lower half of the integrated container into a vacuum chamber;

filing, by a frozen-drug dispenser, a first chamber of a lower half of an integrated container with a frozen compound;

exposing, by microwave emitters within the vacuum chamber, the frozen compound of the first chamber of the lower half of the integrated container to microwave radiation to lyophilize the frozen compound into a lyophilized compound;

filing, by a reconstitution solution dispenser, a second chamber of the lower half of the integrated container with a reconstitution solution;

removing, by the conveyor belt, the lower half of the integrated container out of the vacuum chamber; and sealing, by a container sealer, an upper half of the integrated container onto the lower half of the integrated container to create an integrated package having reconstitution solution in a first chamber of the integrated package and lyophilized compound in a second chamber of the integrated package.

2. The continuous microwave vacuum-drying method of claim 1, wherein the conveyor belt is configured to continuously move the integrated container through the vacuum chamber.

3. The continuous microwave vacuum-drying method of claim 1, wherein the microwave emitters within the vacuum chamber are configured to emit microwave radiation at a frequency that selectively heats water molecules within the frozen compound.

4. The continuous microwave vacuum-drying method of claim 1, wherein the frozen-drug dispenser and the reconstitution solution dispenser are located within the vacuum chamber.

5. The continuous microwave vacuum-drying method of claim 1, wherein the container sealer comprises a press and a heating element configured to thermally bond the lower half of the integrated container to the upper half of the integrated container.

6. The continuous microwave vacuum-drying method of claim 1, wherein the frozen compound comprises a vaccine.

7. The continuous microwave vacuum-drying method of claim 1, wherein the lower half of the integrated container includes a connector forming a communicable channel between the first chamber and the second chamber.

8. The continuous microwave vacuum-drying method of claim 7, wherein the connector comprises a frangible membrane configured to separate the first chamber and the second chamber.

9. The continuous microwave vacuum-drying method of claim 8, wherein the integrated package is a syringe having the first chamber and the second chamber separated by the frangible membrane.

10. A continuous microwave vacuum-drying (CMVD) integrated package assembly system, comprising:

a lower half of an integrated container having a first chamber and a second chamber;

an upper half of the integrated container;

a vacuum chamber configured to maintain a low-pressure gradient between an interior of the vacuum chamber and an exterior of the vacuum chamber;

a frozen-drug dispenser configured to deliver a frozen compound into the first chamber of the lower half of the integrated container;

a microwave emitter configured to emit microwave radiation onto the frozen compound delivered into the first chamber of the lower half of the integrated container;

a reconstitution solution dispenser configured to deliver a reconstitution solution into the second chamber of the lower half of the integrated container;

a container sealer configured to seal the upper half of the integrated container to the lower half of the integrated container to form an integrated package; and a conveyor belt configured to transport the lower half of the integrated container to the frozen-drug dispenser, the microwave emitter, the reconstitution solution dispenser, and then the container sealer, in order.

11. The continuous microwave vacuum-drying (CMVD) integrated package assembly system of claim 10, wherein the conveyor belt is further configured to transport the lower half of the integrated container into and out of the vacuum chamber.

12. The continuous microwave vacuum-drying (CMVD) integrated package assembly system of claim 10, wherein the vacuum chamber comprises an automated series of air-lock doors configured to open and close in a timed sequence that permits maintenance of the low-pressure gradient of the interior of the vacuum chamber while the conveyor belt transports the lower half of the integrated container into and out of the vacuum chamber.

13. The continuous microwave vacuum-drying (CMVD) integrated package assembly system of claim 12, wherein the conveyor belt is operated in a continuous mode.

14. The continuous microwave vacuum-drying (CMVD) integrated package assembly system of claim 10, wherein the frozen compound comprises a vaccine.

15. The continuous microwave vacuum-drying (CMVD) integrated package assembly system of claim 10, wherein the microwave emitters are configured to emit microwave radiation at a frequency that selectively heats water molecules within the frozen compound.

16. The continuous microwave vacuum-drying (CMVD) integrated package assembly system of claim 10, wherein the lower half of the integrated container further comprises a connector having a frangible membrane.

17. A large-container continuous microwave vacuum-drying method, comprising:

loading, into an integrated container, a plurality of lower halves of a plurality of integrated packages;

moving, by a conveyor belt, the integrated container into a vacuum chamber;

filing, by a frozen-drug dispenser, a first chamber of one of the plurality of lower halves of the plurality of integrated packages loaded into the integrated container with a frozen compound;

exposing, by microwave emitters, the frozen compound of the first chamber of one of the plurality of lower halves of the plurality of integrated packages loaded into the integrated container to microwave radiation to lyophilize the frozen compound into a lyophilized compound;

filing, by a reconstitution solution dispenser, a second chamber of one of the plurality of lower halves of the plurality of integrated packages loaded into the integrated container with a reconstitution solution;

removing, by the conveyor belt, the integrated container out of the vacuum chamber; and sealing, by a container sealer, a plurality of upper halves of the integrated packages loaded into the integrated container onto the plurality of lower halves of the integrated packages loaded into the integrated container to create a plurality of prefilled integrated packages.

18. The large-container continuous microwave vacuum-drying method of claim 17, wherein the method is operated in a continuous mode.

19. The large-container continuous microwave vacuum-drying method of claim 17, wherein the vacuum chamber comprises a series of air-lock doors configured to maintain a low-pressure gradient within an inner volume of the vacuum chamber.

20. The large-container continuous microwave vacuum-drying method of claim 17, wherein the frozen compound comprises a vaccine.

* * * * *